United States Patent
Csaszar et al.

(10) Patent No.: US 8,339,939 B2
(45) Date of Patent: Dec. 25, 2012

(54) RE-ROUTING TRAFFIC FLOW IN A PACKET SWITCHED COMMUNICATIONS TRANSPORT NETWORK

(75) Inventors: Andras Csaszar, Budapest (HU); Attila Mihaly, Dunakeszi (HU); Octavian Papp, Tinnye (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 289 days.

(21) Appl. No.: 12/669,800

(22) PCT Filed: Jul. 20, 2007

(86) PCT No.: PCT/EP2007/057515
§ 371 (c)(1),
(2), (4) Date: Jan. 20, 2010

(87) PCT Pub. No.: WO2009/012805
PCT Pub. Date: Jan. 29, 2009

(65) Prior Publication Data
US 2010/0157807 A1 Jun. 24, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/217; 370/218; 370/221; 370/229; 370/230; 370/232; 370/233; 370/234; 370/237; 370/242

(58) Field of Classification Search .................. 370/216, 370/217, 218, 221, 395.23, 229, 230, 232–234, 370/237, 242; 714/1, 4.1, 4.11, 6.3, 48
See application file for complete search history.

(56) References Cited

U.S. PATENT DOCUMENTS

| | | | |
|---|---|---|---|
| 7,230,913 B1 * | 6/2007 | Vasseur et al. | 370/216 |
| 7,978,596 B2 * | 7/2011 | Yamada et al. | 370/217 |
| 2002/0078232 A1 | 6/2002 | Simpson et al. | |
| 2005/0152269 A1 | 7/2005 | Liu | |
| 2006/0146696 A1 * | 7/2006 | Li et al. | 370/218 |
| 2006/0153067 A1 | 7/2006 | Vasseur et al. | |

* cited by examiner

*Primary Examiner* — Michael Thier
*Assistant Examiner* — Benjamin H Elliott, IV
(74) *Attorney, Agent, or Firm* — Coats & Bennett, P.L.L.C.

(57) ABSTRACT

In a packet switched communications transport network a method for re-routing traffic flow is provided. The invention based on the recognition of actual utilization of transport resources. In accordance with the implementation, Fast Re-Route detour paths are recalculated each time after new bandwidth information is received. The detours are re-established on new computed paths if needed, i.e., if an optimized path has been found. A node and a system are also disclosed, referring to MPLS network. Also a node is described acting as a Point of Local Repair for link failures. The node comprises a Routing engine, a Link state database, a Detour path calculator and a Detour path establisher in order to capture bandwidth information of the network links and to calculate detour path information for the nodes.

10 Claims, 3 Drawing Sheets

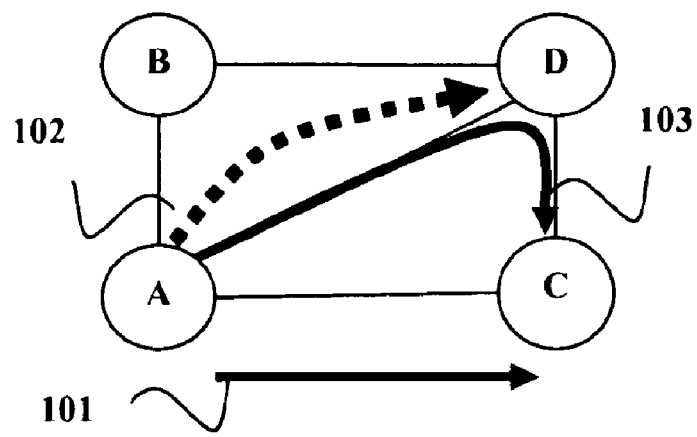
*Figure 1/A*
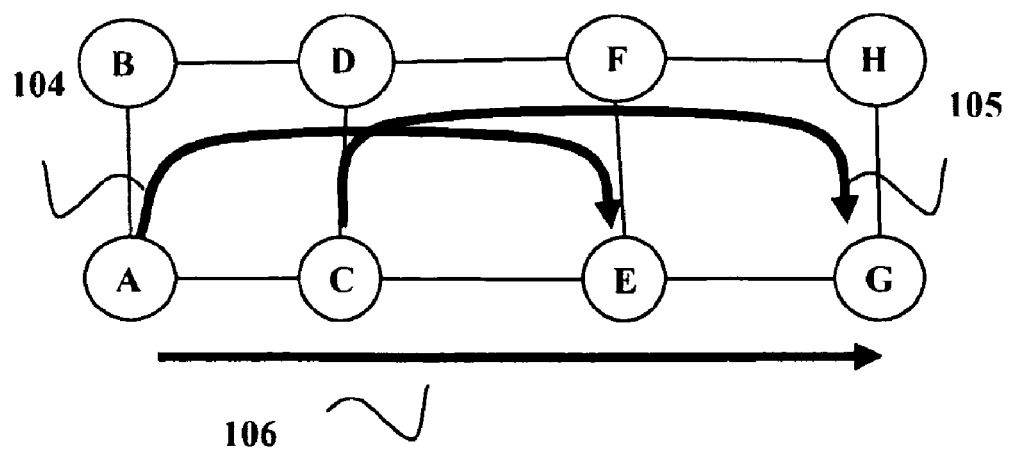
*Figure 1/B*

RE-ROUTING TRAFFIC FLOW IN A PACKET SWITCHED COMMUNICATIONS TRANSPORT NETWORK

BACKGROUND OF THE INVENTION

1. Technical Field of the Invention

The invention relates in general to packet switched communications transport network. In particular, and not by way of limitation, the present invention directed to a method, a node and a network for a Multi-Protocol Label Switching (MPLS) network.

2. Description of Related Art

The exponential growth of the Internet over the past several years has placed a tremendous strain on the service provider networks. Not only has there been an increase in the number of users but there has been a multifold increase in connection speeds, backbone traffic and newer applications. Initially ordinary data applications required only store and forward capability in a best effort manner. The newer applications like voice, multimedia traffic and real-time e-commerce applications are pushing toward higher bandwidth and better guarantees, irrespective of the dynamic changes or interruptions in the network.

To honor the service level guarantees, the service providers not only have to provide large data pipes, but also look for architectures which can provide QoS guarantees and optimized performance with minimal increase in the cost of network resources.

With the advancement of the convergence of multi-service network onto a common Internet Protocol (IP) backbone, the resilience properties of IP-based transport networks receive increasing attention.

Investigating the resilience properties of multi-service IP/MPLS networks, an outcome of an important observation relating to the availability of the transport network was that the transport should be considered unavailable not only if it does not provide connectivity but also if it provides connectivity but the provided performance is so poor that sessions cannot be retained. One common cause of performance degradation is network congestion. Performance in terms of delay, jitter and packet loss is mostly impacted by congestion in an overloaded network segment.

In order to cope with the overload, networks are typically over-dimensioned so that under normal circumstances the probability of congestion is minimal. However, re-routing due to node or link failures is a very likely reason of congestion and so of an unavailable network.

After a failure, the protection and restoration mechanisms are responsible to restore connectivity as fast as possible so that ongoing sessions are not interrupted. While pure IP routing protocols are able to re-calculate the routes in the order of a few seconds, this fail-over time may not be enough for certain applications. If quicker fail-over is required, typically protection-switching methods are implemented where packets are quickly diverted to pre-established backup paths using MPLS backup Label Switched Paths (LSPs) in MPLS/IP networks.

MPLS technology enables Service Providers to offer additional services for their customers, scale their current offerings, and exercise more control over their growing networks by using its traffic engineering capabilities. While the MPLS solution is fast, it has a problem that if there is a failure in the backup path, and there is no more backup configured, connectivity may be lost. An IP routing protocol on the other hand could still find another alternative path after re-calculating the routing table. Therefore, instead of protection with static end-to-end backup path, MPLS networks often apply local protection switching, called Fast Re-Route (FRR) in combination with head-end re-routing of the MPLS tunnels. Summarised, the operation is such that each router has a so called detour LSP configured for each outgoing link and neighbour node. If the link fails, the router detecting this failure can immediately activate the detour, which can be used as long as the head-end router of the edge-to-edge LSP learns about the failure and re-calculates a new edge-to-edge path dynamically based on the IP routing protocol.

However, there are a lot of inefficiencies with respect to the related art.

Pure IP routing protocols e.g. Open Shortest Path First (OSPF) or Intermediate System to Intermediate System (IS-IS) do not require any additional configurations for traffic rerouting in case of failures, but have typically slow convergence properties after failures (in the order of 1 second or more), as it was mentioned before, and they can only calculate the shortest path, which can then easily become congested if more end-to-end routes will use the same link or network segment. So there is no Quality of Service (QoS) guarantee on the protection path, i.e., congestion may occur after failover. In cases of severe congestion this will even cause availability problems. Traffic engineering with off-line optimization of link weights to provide an optimized network load even after failures has proven to be a very difficult task which makes a scalability problems for large networks.

MPLS protection switching on the head-end of the tunnels pre-configured with bandwidth reservation gives a prompt solution to the congestion problem, but it is not resilient to multiple failures because if there is a failure also on the backup path, connectivity cannot be restored in the absence of further backups. Although the fail-over times are smaller than in the case of plain IP rerouting, they are still considerably larger than the fail-over times for the legacy networks, due to the fact that the failure notification has to reach the head-end node to get acquainted with the failure and re-direct the traffic on the protection path. Moreover, in large networks the big number of edge nodes leads to a very high number of edge-to-edge primary and backup LSPs to configure. The solution how to provide short fail-over times has been given by the MPLS-FRR architecture, since in this case the failure notification does not have to reach the head-end node, as the node observing the failure on the directly connected link, referred to as the Point of Local Repair (PLR) has the responsibility to re-direct the traffic on the detour paths, however the scalability properties of the concept are insufficient, since a multitude of detour paths are in principle needed to protect for all possible failures. A solution for scalability was offered, however, by making possible merging of detour paths with the original LSP and the possibility for so-called facility backups, which protect a given element with the same bypass tunnel for all different LSPs using that element. Management-wise the solution for scalability was offered by the possibility of automated setup of detour paths during the setup of the primary LSPs as it was described in IETF RFC 4090, "Fast Reroute Extensions to RSVP-TE for LSP Tunnels", May 2005; and "Extensions to RSVP-TE Fast Reroute", Internet Draft, December 2005. As it is seen, MPLS-FRR represents a trade-off in the sense that QoS can be guaranteed by bandwidth reservation also on the detour paths. The price for bandwidth reservation is however a substantially reduced utilization of network resources.

Other disadvantages of the prior art are disclosed by M. S. Kodialam and T. V. Lakshman, in "Dynamic Routing of Locally Restorable Bandwidth Guaranteed Tunnels Using Aggregated Link Usage Information," in Proc. of Infocom, April 2001, pp. 376-385; and by S. Raza, F. Aslam, Z. A. Uzmi, "Online Routing of Bandwidth Guaranteed Paths with Local Restoration using Optimized Aggregate Usage Information", Proceedings of IEEE ICC'05 Communications QoS, Reliability and Performance Modeling Symposia, 2005, proposing usage of on-line constraint-based optimization algorithms based on some lightweight link reservation information signalling. Although claimed to be very efficient, the methods solve the low utilization problem only partially, as they are all based on bandwidth reservation of backup paths, due to which an enormous amount of bandwidth is wasted.

It is an objective with this invention to improve the solutions described above by providing re-routing traffic flow in a packet switched communications transport network, which makes a better usage of the network resources.

SUMMARY OF THE INVENTION

The present invention involves a method, a node and a network, which solve the aforementioned problems that will become apparent from an understanding of the following description.

The invention based on the recognition that a new lightweight router function shall be established that makes possible a setup of detour paths without bandwidth reservation with a less probability of congestion and in this way it offers both QoS guarantees and high utilization of network resources at the same time.

Accordingly, an embodiment of the invention relates to a method for rerouting traffic flow in a communications network. The method is implemented by the steps of recalculating the FRR detour paths in the nodes each time after they receive new bandwidth information or when setup of a new detour is required and then re-establishing, without resource reservation, the detours on new computed paths if an optimized path has been found. An optimized path can be e.g. the shortest path where there is enough managed bandwidth to be reserved and, if no optimized path has been found based on free managed bandwidth, where the free (currently not utilized) capacities are higher than the current demand of the LSP.

In another aspect, the present invention is directed to a node which acts as a Point of Local Repair for link failures. The node comprises means for receiving new bandwidth information of links between nodes, means for checking free managed bandwidth on detour of links, means for recalculating fast re-route detour paths in case if there is not enough managed bandwidth, means for optimizing all detour paths based on free capacity of the links if no optimized path has been found based on free managed bandwidth, and means for re-establishing the detours on new computed paths without requiring reservation by sending setup message for new detours if an optimized path has been found.

In yet another aspect, the present invention refers to a communications network in which link information is distributed comprising bandwidth information of links between nodes furnished by means for receiving new bandwidth information of links between nodes, means for checking free managed bandwidth on detour of links, means for recalculating fast re-route detour paths in case if there is not enough managed bandwidth, means for optimizing all detour paths based on free capacity of the links if no optimized path has been found based on free managed bandwidth, and means for re-establishing the detours on new computed paths without requiring reservation by sending setup message for new detours if an optimized path has been found.

The most important advantage of the invention is that the backup LSPs will be re-established periodically on the shortest path where there is enough capacity to be reserved or where the free (currently not utilized) network resources are higher than the current demand of the LSP. As a result, when a failure occurs, the best possible backup from the congestion perspective is already established and can be used immediately. That is, the advantages of FRR are preserved but the congestion properties are improved, moreover there is no resource reservation for the detour, so the efficiency problems are also resolved.

BRIEF DESCRIPTION OF THE DRAWINGS

For a more complete understanding of the invention, reference is made to the following detailed description taken in conjunction with the accompanying drawings wherein:

FIG. 1/A is a simplified diagram for a part of a communications network with a detour path;

FIG. 1/B is another representation of the communications network with two detour paths;

DETAILED DESCRIPTION OF THE BEST MODE AND THE PREFERRED EMBODIMENTS

FIG. 1/A depicts a part of a communications network with four nodes A, B, C and D linked together illustrated by solid lines among them. Assume, that a Label Switched Path (LSP) 101 is reserved for link between node A and C and another LSP 102 for nodes A and D. A detour LSP 103 is also reserved for the first LSP 101 from node A through node D to node C. Also assume that both link capacities and LSP bandwidth are equal to 1. It can be seen that link between node A and D would not have enough capacity (i.e. equal to 2) due to dynamic routing of LSP requests that arrive one-by-one with no a priori knowledge of future arrivals. Our aim is to avoid a scenario where dynamic routing of LSPs and bandwidth reservation of detour paths result in suboptimal utilization of network resources, where the second LSP 102 could not be set up because of the chosen path of the first LSP 101 detour tunnel prior to the second LSP 102.

Another problem that can be eliminated by the invention is the double reservation resulting in low bandwidth utilization as it is described in FIG. 1/B. Assume that nodes A, B, C, D, E, F, G and H are linked together as illustrated in the figure, and an LSP 106 is reserved from node A to node G. If a detour path 104 is reserved for node C and another detour path 105 for node E, then a double reservation could be done for link between node D and node F. It could stem from the fact that bandwidth would be reserved separately for each detour LSP. Thus, it is not taken into account that not all LSPs will have to use their backup paths in case of a failure, and so the backup paths could share the free bandwidth on a link if they represented the detour for different link failures. Such a scenario should be also avoided by the invention. Note 0 that the figure depicts a case when double reservation occurs by the protection paths of the same primary LSP. Clearly, problems due to unnecessary reservations may occur also between backup paths protecting different primary LSPs.

Figure 2:
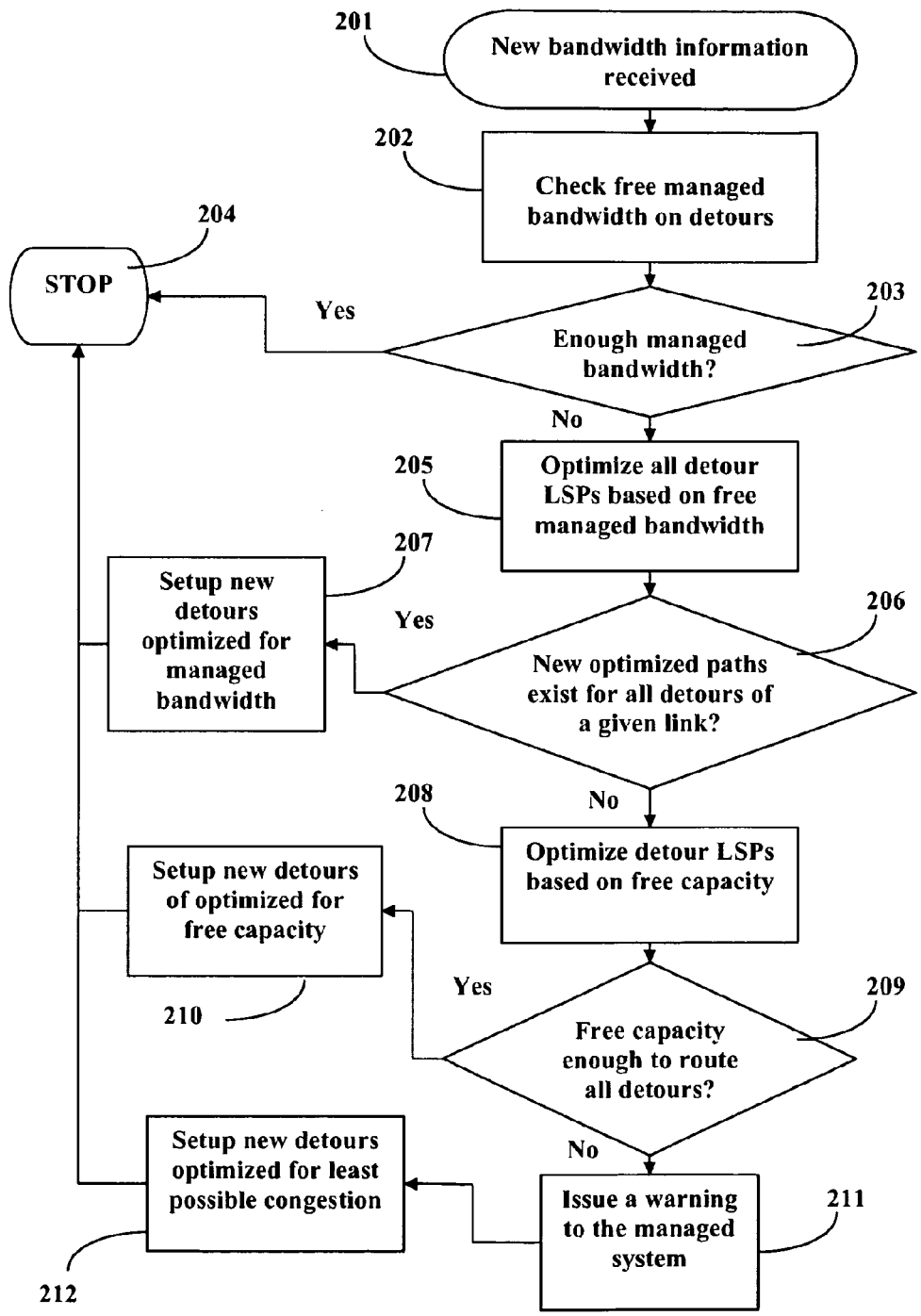
FIG. 2 is a flowchart illustrating an advantageous embodiment of detour paths calculation.

FIG. 2 describes an advantageous embodiment of the invention in which both managed bandwidth and free capacity are considered in the calculation of detour paths.

In the first step 201, new bandwidth information is received. New information refers to managed bandwidth as well as free capacities of actual utilization of transport resources. Managed bandwidth is propagated by standardised Open Shortest Path First (OSPF-TE) messages, and actual utilization is carried out by a dynamic distribution of free capacities of links to all nodes e.g. by Link State 30 Advertisement (LSA) messages of OSPF.

In the next step 202 it is checked whether the existing detours are properly setup, i.e., to check whether they have enough resources on their existing allocated paths. Then a decision 203 is made if the reservations of the primary LSPs leave enough free managed bandwidth (i.e., unreserved capacity) for the existing detours. If yes, then it is not needed to do anything, the algorithm can stop 204. However, this is often not the case, since LSPs are dynamically setup and tore down and the method has to be continued.

Therefore, optimization is likely required based on free managed bandwidth in the first round in step 205. For the optimization, the node should assume that the free managed bandwidth of each link is the link capacity minus the reserved bandwidth on the link. The demands are identical to the reserved or actual measured bandwidth of the primary LSPs that can be queried from the local router Management Information Base (MIB). On this graph, the node should try to direct all its own detours in step 206.

If it is possible, i.e., there is enough unreserved bandwidth in the topology to fit all detours, then it should setup the detours on the calculated paths (step 207).

However, if there is not enough unreserved bandwidth to direct all detour LSPs, the node should try to optimize the detour LSPs based on the real free capacities in step 208 that it reserved. That is, this time the optimization algorithm should assume a graph, where the link capacities are the latest measured free capacities (that were flooded to the actual node).

Then a third decision is made in step 209 in which free capacities are checked to route all detours. If there is enough free capacity to direct all traffic, the detour LSPs should be setup on the calculated paths in step 210. Otherwise if it is not possible to setup congestion-free detour LSPs, the router should issue a warning towards the management system (step 211), and it should try, as a last resort, to setup detours causing the least possible congestion in case of a failure in step 212.

The method above shall be also used when the setup of a new detour is required. In this case in step of checking of enough managed bandwidth (step 203), before step 204, the setup of the new detour is established.

It is clearly seen that the method described above preserves the advantages of MPLS-FRR, i.e., it is fast, since the FRR backup path is already configured when a failure occurs. It is also obvious that the method is scalable, since it is not needed to manually configure backup paths for LSPs. The method offers an optimized-setup of detour paths also in case of shortage of reservable resources by considering also the current load of network resources.

It is also possible to recalculate detours based on Constrained Based Shortest Path First (CSPF) algorithm. CSPF is an extension of shortest path algorithms like OSPF and IS-IS. The path computed using CSPF is a shortest path fulfilling a set of constraints. It simply means that it runs shortest path algorithm after pruning those links that violate a given set of constraints. A constraint could be minimum bandwidth required per link (also know as bandwidth guaranteed constraint), end-to-end delay, maximum number of link traversed etc. CSPF is widely used in MPLS Traffic Engineering.

Figure 3:
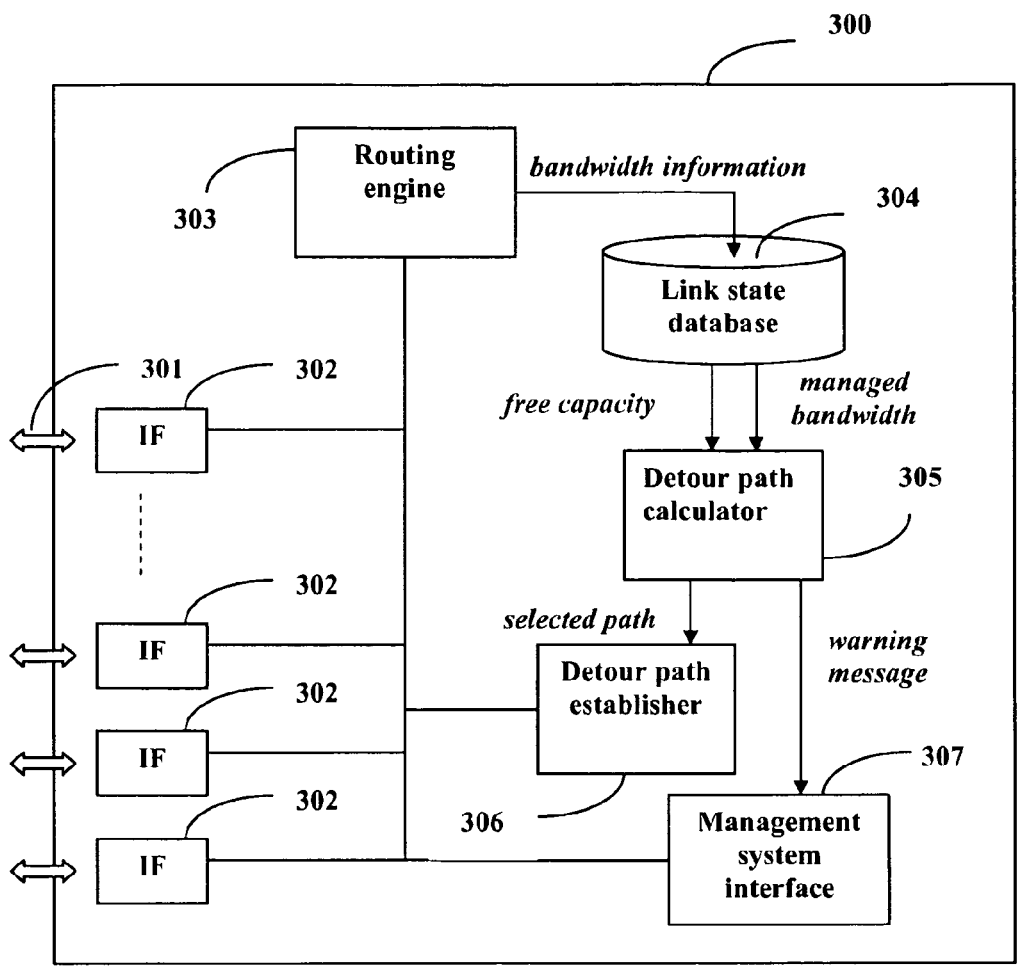
FIG. 3 is a preferred embodiment of a node calculating detour paths.

FIG. 3 shows a possible embodiment of a node 300 implementing the method. The node 300 communicates with other adjacent nodes trough interfaces 302 exchanging packets 301. Packets which comprises bandwidth information are captured by a Routing engine 303, for instance OSPF or IS-IS. The Routing engine 303 stores the bandwidth information in a Link state database 304 which contains for each links at least the source IP address, destination ip address, managed bandwidth and free capacity. A Detour path calculator 305 turns to the Link state database 304 for selecting, if necessary, new paths based on managed bandwidth and free capacity. Detour path calculator 305 controls the Detour path establisher 306 in order to re-establish, without resource reservation, the detours on new selected paths. If the selected paths calculated by Detour path calculator 305 causes shortage of free capacity to route all detours, warning message is also sent out through a Management system interface 307.

A communications network having nodes described above and linked together for transporting packet switched traffic can utilize link information comprising managed bandwidth and optionally free capacity of links between nodes. Such a communications network can minimize the probability of congestion, since both the temporarily used backup and the newly calculated path are established on a path with enough free capacity whenever this is possible.

Another advantage is that it allows an efficient utilization of transport resources, by eliminating the need for applying bandwidth reservation for the detour paths. In this way, both the problems related to dynamic LSP setup and unnecessary reservation are solved. As a result, both the ratio of successfully set up LSPs and the availability of the network are increased (i.e., the transport downtime is decreased).

Although preferred embodiments of the present invention have been illustrated in the accompanying drawings and described in the foregoing detailed description, it is understood that the invention is not limited to embodiments disclosed for MPLS network; but is capable of numerous rearrangements, modifications, and substitutions for packet switched communications transport network for instance in which nodes act as points of local repair and are furnished with a protocol of fast re-route without departing from the spirit of the invention, based on the actual utilization of transport resources, as realized and defined by the following claims.

What is claimed is:

1. A method for re-routing traffic flow in a packet switched communications transport network having nodes interconnected to each other with links establishing Label Switched Paths (LSPs) across the network, in which detour LSPs are set for Fast Re-Route (FRR), comprising the steps of:
   receiving new, managed bandwidth information of links between nodes;
   checking free managed bandwidth on detour LSPs of links between nodes;
   recalculating FRR detour LSPs responsive to determining that the existing LSPs do not have enough managed bandwidth;
   optimizing all detour LSPs based on free capacity of the links between the nodes responsive to determining that no optimized LSP has been found based on free managed bandwidth, wherein the free managed bandwidth of a link is a link capacity minus a reserved bandwidth of the link; and
   re-establishing the detours on new computed LSPs without requiring reservation by sending a setup message for new detour LSPs responsive to determining that an optimized LSP has been found.

2. The method of claim 1, wherein the recalculation is initiated after a node receives a new request for a new detour LSP.

3. The method of claim 1, wherein the recalculation is based on the regularly distributed information about free managed bandwidth.

4. The method of claim 3, wherein the recalculation is based on a Constraint Based Shortest Path First algorithm.

5. The method of claim 4, wherein the managed bandwidth and the free capacity are dynamically propagated by a link state routing protocol.

6. The method of claim 3, wherein the managed bandwidth is dynamically propagated by a link state routing protocol.

7. The method of claim 6, wherein the managed bandwidth is dynamically propagated by a link state routing protocol periodically.

8. A node for re-routing traffic flow in a packet switched communications transport network having nodes interconnected to each other with links establishing Label Switched Paths (LSPs) across the network, in which detour LSPs are set for Fast Re-Route (FRR), said node configured to:
   receive new, managed bandwidth information of links between nodes;
   check free managed bandwidth on detour LSPs of links between nodes;
   recalculate FRR detour LSPs responsive to determining that the existing LSPs do not have enough managed bandwidth;
   optimize all detour LSPs based on free capacity of the links between the nodes if responsive to determining that no optimized LSP has been found based on free managed bandwidth, wherein the free managed bandwidth of a link is a link capacity minus a reserved bandwidth of the link; and
   re-establish the detours on new computed LSPs without requiring reservation by sending a setup message for new detour LSPs responsive to determining that an optimized LSP has been found.

9. A packet switched communications transport network having nodes for re-routing traffic flow interconnected to each other with links establishing Label Switched Paths (LSPs) across the network, in which detour LSPs are set for Fast Re-Route (FRR), said nodes configured to:
   receive new, managed information of links between nodes;
   check free managed bandwidth on detour LSPs of links between nodes;
   recalculate FRR detour LSPs responsive to determining that the existing LSPs do not have enough managed bandwidth;
   optimize all detour LSPs based on free capacity of the links between the nodes responsive to determining that no optimized LSP has been found based on free managed bandwidth, wherein the free managed bandwidth of a link is a link capacity minus a reserved bandwidth of the link; and
   re-establish the detours on new computed LSPs without requiring reservation by sending a setup message for new detour LSPs responsive to determining that an optimized LSP has been found.

10. The communications transport network of claim 9, wherein the network is a Multi-Protocol Label Switching (MPLS) network.

* * * * *

UNITED STATES PATENT AND TRADEMARK OFFICE
CERTIFICATE OF CORRECTION

PATENT NO. : 8,339,939 B2  Page 1 of 1
APPLICATION NO. : 12/669800
DATED : December 25, 2012
INVENTOR(S) : Csaszar et al.

It is certified that error appears in the above-identified patent and that said Letters Patent is hereby corrected as shown below:

In the Specification

In Column 4, Line 60, delete "Note 0 that" and insert -- Note that --, therefor.

In Column 5, Line 55, delete "optimized-setup" and insert -- optimized setup --, therefor.

In the Claims

In Column 7, Line 5, in Claim 3, delete "on the regularly" and insert -- on regularly --, therefor.

In Column 7, Line 31, in Claim 8, delete "nodes if" and insert -- nodes --, therefor.

Signed and Sealed this
Seventh Day of January, 2014

Margaret A. Focarino
*Commissioner for Patents of the United States Patent and Trademark Office*